March 17, 1964     J. FOSTER ETAL     3,125,760
FUEL LOCATING AND SUSPENDING SYSTEM FOR NEUTRONIC REACTOR CORE
Original Filed March 31, 1958     7 Sheets-Sheet 1

INVENTORS.
Julius Foster
Arthur P. Fraas
BY   Alfred M. Perry

ATTORNEY

INVENTORS.
Julius Foster
Arthur P. Fraas
Alfred M. Perry

ATTORNEY

March 17, 1964 J. FOSTER ETAL 3,125,760
FUEL LOCATING AND SUSPENDING SYSTEM FOR NEUTRONIC REACTOR CORE
Original Filed March 31, 1958 7 Sheets-Sheet 5
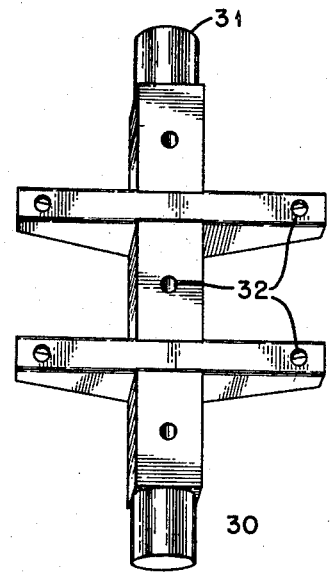
Fig. 7.
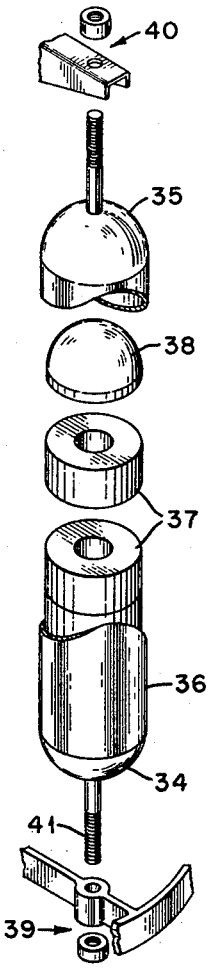
Fig. 9.
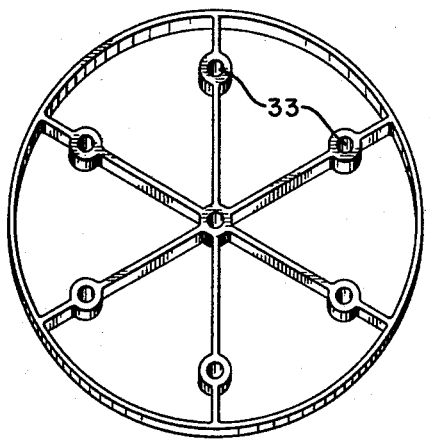
Fig. 8.
INVENTORS.
Julius Foster
Arthur P. Fraas
Alfred M. Perry
BY
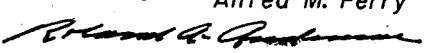
ATTORNEY March 17, 1964 J. FOSTER ETAL 3,125,760
FUEL LOCATING AND SUSPENDING SYSTEM FOR NEUTRONIC REACTOR CORE
Original Filed March 31, 1958 7 Sheets-Sheet 7
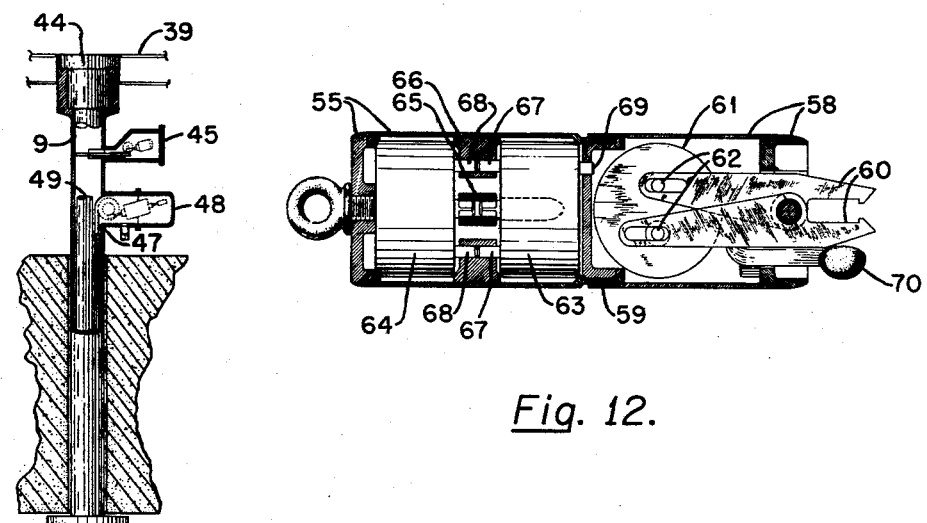
*Fig. 12.*
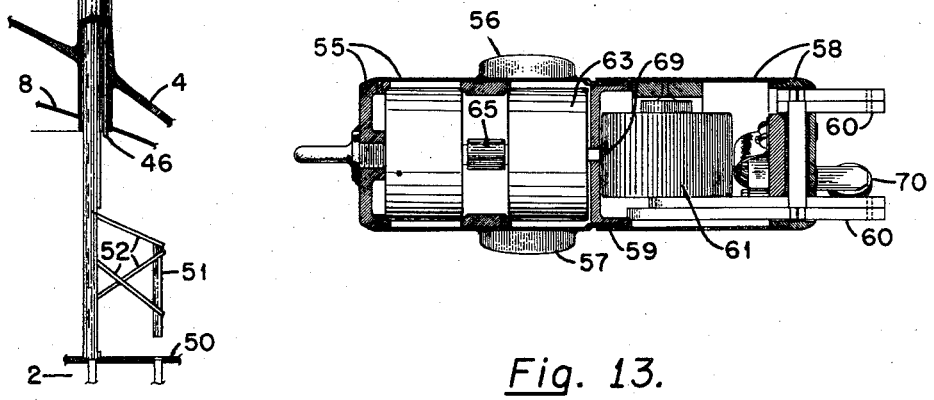
*Fig. 13.*
Fig. 11
INVENTORS.
Julius Foster
Arthur P. Fraas
Alfred M. Perry
BY
ATTORNEY United States Patent Office 3,125,760
Patented Mar. 17, 1964

3,125,760
FUEL LOCATING AND SUSPENDING SYSTEM FOR NEUTRONIC REACTOR CORE
Julius Foster, Oak Ridge, Arthur P. Fraas, Knoxville, and Alfred M. Perry, Oak Ridge, Tenn., assignors to the United States of America as represented by the United States Atomic Energy Commission
Original application Mar. 31, 1958, Ser. No. 725,458. Divided and this application Feb. 19, 1960, Ser. No. 10,536
2 Claims. (Cl. 176—41)

Our invention relates generally to the neutronic reactor art and more particularly to novel, gas-cooled power reactors which display high fuel burnups. This application is a divisional application of our co-pending application, Serial No. 725,458, filed March 31, 1958, for "Gas-Cooled Neutronic Reactor."

As used in this application, the following terminology is defined as indicated below:

Reactor active portion (core)—That inner portion of a neutronic reactor which contains fissionable material and is characterized by a multiplication constant ($k$) greater than unity. The symbol ($k_\infty$) is sometimes used to represent the multiplication constant ($k$).

Moderator material—A non-gaseous material for which the ratio $$\xi \frac{\sigma_s}{\sigma_a}$$

is greater than 10, where $\xi$ is the average loss in the logarithm of the energy of a fast neutron per elastic collision with the material, $\sigma_s$ is the thermal neutron elastic scattering cross section per atom of the material, and $\sigma_a$ is the thermal neutron absorption cross section per atom of the material.

Power density—Heat produced in a reactor per unit volume of the active portion of that reactor. It is usually expressed in units such as kilowatts/liter.

Fuel exposure—Total energy extracted per unit weight of fuel, usually expressed in megawatt-days per ton.

Terminology not specifically defined herein is used in the sense which it is used in Principles of Nuclear Reactor Engineering, Samuel Glasstone, D. Van Nostrand Company, Inc., New York (1955). Detailed descriptions of reactor theory, construction, and operation may be found in Glasstone, in Patent No. 2,708,656, issued May 17, 1955, to the common assignee in the names of E. Fermi and L. Szilard, and Patent No. 2,780,595, issued February 5, 1957, to the common assignee in the name of E. Fermi.

It has been known that energy created in neutronic reactors by the fissioning of certain isotopes could be removed therefrom by a host of coolants, including gases. However, the major effort in the United States heretofore has been expended in the development of liquid cooled reactors. Such concentration of effort has been entirely reasonable prior to the invention of the present application because gas cooled reactors have manifested many deficiencies.

Prior gas-cooled reactors have been fueled largely with natural uranium, which, although it is the least costly fuel, also necessitates an extremely large reactor and results in low power densities. In addition, gas cooled reactors have exhibited relatively short fuel exposures because of fuel deformation and the low amount of initial excess reactivity that is available from natural fuel. As a neutronic reactor operates at an excess reactivity of zero or an effective multiplication factor of unity, fuel burnup and a buildup of deleterious neutron-absorbing fission products causes the effective multiplication factor to fall below the required value of one; therefore, excess reactivity, which is initially built into the reactor, but initially prevented, by control means, from contributing to the neutron flux during operation, must be continuously and gradually permitted to contribute to the chain reaction to sustain the essential multiplication factor. When this excess reactivity reaches some minimum value such that the effective multiplication factor can no longer be practicably maintained at unity, the fuel of the active portion must be at least partially replaced. Each fuel unit that is placed in a neutron reactive assemblage has, therefore, a definite lifetime which is governed, in part, by the initial concentration of fissionable material in that unit. As a result natural fueled reactors have been characterized by relatively short fuel burnup times.

In addition, fuel exposure is limited by physical degradation and deterioration of the fuel. When natural uranium is used, the choice of structural materials is limited because all materials except those displaying extremely low neutron absorption cross sections are eliminated.

Gases are relatively poor heat transfer agents, so, for a given amount of heat transfer area, a gas will extract much less heat than a liquid would under similar circumstances. As a result, the power densities of prior gas-cooled reactors have been low, thereby requiring high capital investments. Since the capital investment of a power reactor must be amortized by income from the power produced in the reactor, power costs are, therefore, high in reactors which require large capital investments.

Prior graphite-moderated, natural uranium reactors have been additionally characterized by a positive moderator-temperature coefficient of reactivity after operation of these reactors for extended periods of time. A positive temperature coefficient of reactivity is very undesirable, since the inherent safety of a reactor displaying such a coefficient is markedly reduced. Although proper control design, which involves additional expense, can minimize the hazards associated with the operation of a reactor which manifests a positive coefficient, the disadvantage is still present and must be weighed in a comparison of gas and liquid cooled reactors.

Graphite-moderated, natural uranium reactors have also had the disadvantage of fuel-temperature coefficients of reactivity which, although negative, were insufficiently negative to provide the desired safety factor with respect to short-term or transient effects of temperature changes upon reactivity.

It has appeared that utilization of fuel enriched in the 235 isotope of uranium might obviate some of the disadvantages described above. However, the cost of even slightly enriched fuel is very high and, as a result, it has been accepted heretofore that the advantages to be gained by using an enriched fuel would not be sufficient to compensate for the increased fuel costs resulting from such use.

The inherent disadvantages of natural uranium-fueled, gas-cooled reactors have therefore been accepted, and the major endeavor in the prior gas-cooled reactor art has been directed toward the development of natural uranium fueled reactors and not toward an elimination or minimization of these disadvantages by enrichment.

It is, therefore, a general object of our invention to provide a novel class of gas-cooled reactors capable of producing power at costs lower than gas-cooled reactors of the prior art.

Another object of our invention is to provide a novel class of gas-cooled neutronic reactors characterized by high power densities.

Another object of our invention is to provide a novel class of gas-cooled neutronic reactors which display a negative temperature coefficient of reactivity throughout their operating lifetime.

Another object of our invention is to provide a novel class of gas-cooled neutronic reactors capable of high-temperature operation, e.g., at coolant outlet temperatures above approximately 1000° F.

A further object of our invention is to provide a novel class of gas-cooled neutronic reactors in which a reactor designer can employ a greater variety of structural materials than the designers of prior gas-cooled reactors.

These and other objects of our invention will become apparent to those skilled in the art from the following description of our invention taken in conjunction with the accompanying drawings wherein:

FIG. 7 is a perspective view of a fuel element hanger;

FIG. 8 is a perspective view of a fuel element bottom spacer;

FIG. 9 is an exploded view, partially in section, of one fuel capsule and associated hanger and bottom-spacer structure;

FIG. 11 is a vertical elevation of one fuel element charging tube and associated structure, partially in section;

FIG. 12 is a partial sectional view of a fuel element grab assembly; and

FIG. 13 is a second partial sectional view of the grab assembly, rotated 90° around the major axis from the view of FIG. 12.

In accordance with the principles of our invention, we provide an improved active portion for refractory fueled reactors comprising a solid refractory moderator having a multiplicity of coolant channels passing therethrough; a multiplicity of discrete fissionable fuel bearing masses which are suspended in tension in the channels and which contain from approximately 1 to approximately 4 weight percent $U^{235}$; a gaseous coolant adapted to be continuously passed through the channels, and means to control the reactivity of the active portion.

Any refractory fuel which is fissionable is suitable for use in the reactor we provide. However, the oxides of uranium are generally preferred, and $UO_2$ is especially preferred as a result of its properties which will be discussed below.

We have found that the utilization of fissionable fuel containing from approximately 1 to approximately 4 weight percent $U^{235}$ in a gas-cooled reactor provides advantages heretofore unobtainable in gas-cooled reactors and results in a marked saving in the cost of power production as compared to prior natural-uranium-fueled reactors. By using enriched fuel we have been able to use stronger materials of construction, such as stainless steel and to use high temperature refractory fuels, such as $UO_2$. The use of stainless steel, which manifests relatively high strengths at high temperatures, has enabled us to maintain a higher exit gas temperature. Moreover, the utilization of $UO_2$ has resulted in a fuel element which does not display the deformation which is characteristic of uranium metal, thus permitting a long fuel lifetime.

By enriching to the range which we prescribe, which is in excess of the enrichment required for simple criticality, we have found that the nuclear poisoning effect of the $Pu^{240}$ which is produced can be overcome to such an extent that a point is reached where $Pu^{240}$, which acts as a fertile material, begins to produce fissionable $Pu^{241}$ in such quantity that it adds to the reactivity of the system in an appreciable manner, thereby effecting an increase in reactivity lifetime.

As a result of the increases in reactivity lifetime just discussed, the over-all fuel costs of a gas-cooled reactor using enriched fuel are lower than those which were anticipated and are, essentially, comparable to the fuel costs of natural uranium-fueled systems.

Figure 1:
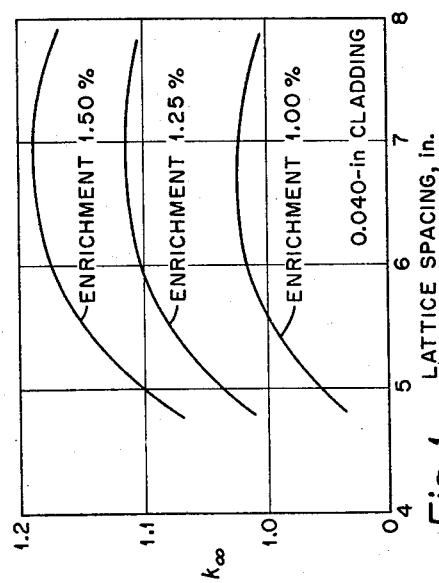
FIG. 1 is a graph showing the relationship between lattice spacing and multiplication factor.

Another effect of enrichment is that it allows the utilization of a small lattice spacing, thereby allowing more fuel to be placed in a given volume of reactor core, which results in higher power densities than can be obtained in comparable natural systems. If a plot of $k_\infty$ is made as a function of lattice spacing, a curve will result, for any given enrichment and for a given fuel element geometry, that will pass through a maximum at an optimum lattice spacing and will fall off on either side of that maximum. FIG. 1 is a representative plot of this type made for three degrees of enrichment and is used at this point for illustrative purposes only. It can be seen from FIG. 1 that an increase in enrichment results in an increase in $k_\infty$ for the system at any given lattice spacing, and that there is a definite value of spacing at which $k_\infty$ is a maximum for each enrichment. It is, however, possible by reducing the lattice spacing to increase the amount of fissionable fuel per unit volume of the active portion and thereby increase the power density of the system. At low values of enrichment or in the absence of enrichment (i.e., if natural uranium is used), the amount of $k_\infty$ in excess of unity is very small; therefore, it is impossible to reduce the lattice spacing to the desired extent in systems of low enrichment. On the other hand, in enriched systems, where the amount of $k_\infty$ in excess of that required for criticality is higher, a relatively small amount of reactivity can be sacrificed to obtain higher power densities. Since the enrichment which we prescribe for the reactors which we provide is sufficiently high to allow a reduction in lattice spacing, these reactors are characterized by higher power densities than were manifest in prior gas-cooled reactors.

Figure 2:
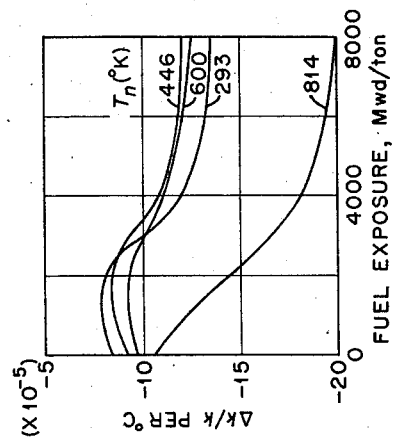
FIG. 2 is a graph displaying the moderator temperature coefficient of reactivity as a function of fuel exposure in the reactors which we provide.

A natural consequence of the reduction in spacing is a decrease in the ratio of moderator to fissionable fuel, which results, in turn, in an active portion containing larger numbers of epithermal neutrons. Since the magnitude of the cross sections of nuclei are dependent upon neutron energy, there results a change in the distribution of neutronic reactions within the active portion of the reactor. For example, an increase in neutron energy may result in a change in the cross section of one nucleus which is greater than the change in the cross section of a different nucleus, thereby altering the reaction rates of these nuclei in different degrees. The effect of such a change in the neutron spectrum, as a result of an altered lattice spacing, on reactor characteristics is, superficially, extremely unpredictable. In the class of reactors which we provide, the increase of epithermal neutrons has resulted in a fortuitous elimination of one major disadvantage of the prior gas-cooled reactors. We have found that our reactors are characterized by negative moderator temperature coefficients of reactivity over their entire operating lifetime. Referring to FIG. 2, which is a graph showing the relationship between fuel exposure and the moderator temperature coefficient of reactivity at various neutron temperatures, it can be seen that the temperature coefficient displayed by our reactors is always negative. As was stated previously, prior gas-cooled reactors were plagued with moderator temperature coefficients that became strongly positive after relatively short fuel exposures. For example, the British Calder Hall reactors display a strong positive moderator temperature coefficient of reactivity after a fuel exposure of approximately 1000 mwd./t.

The moderator temperature coefficient of reactivity, as discussed above, can be represented by the following:

$$\frac{1}{k_{eff}} \frac{dk_{eff}}{dT_m} = \frac{1}{f} \frac{df}{dT_m} + \frac{1}{\eta} \frac{d\eta}{dT_m} - \tau B^2 \frac{1}{\tau} \frac{d\tau}{dT_m}$$
$$- \frac{L^2 B^2}{1+L^2 B^2} \frac{1}{L^2} \frac{dL^2}{dT_m} - M^2 B^2 \frac{1}{B^2} \frac{dB^2}{dT_m} - \frac{P}{1+P} \frac{dP}{dT_m}$$

wherein $T_m$ is the moderator temperature, $P$ is the ratio of the neutron absorption rate in fission product poisons to that in fuel, and the remaining symbols are as normally employed in reactor theory (cf. Glasstone, supra, pp. 217–220).

The fuel temperature coefficient of reactivity is of more importance with respect to short-term or transient temperature effects than the moderator temperature coefficient. The fuel temperature coefficient may be represented by the following:

$$\frac{1}{k_{eff}} \frac{dk_{eff}}{dT_f} = \frac{1}{\epsilon} \frac{d\epsilon}{dT_f} + \frac{1}{p} \frac{dp}{dT_f}$$

where $T_f$ is the fuel temperature and the remaining symbols are as normally employed in reactor theory (Glasstone, spura). With respect to this coefficient, also, our reactors are advantageous in comparison to the prior graphite-moderated natural uranium reactors. Our reactors provide a more negative fuel temperature coefficient of reactivity throughout the life of the fuel, thus providing a greater factor of safety with respect to short-term or transient temperature effects.

The reactors which we provide are advantageous in still another respect as to which prior gas-cooled reactors were disadvantageous. Fuel exposures in prior reactors have been limited to some extent by mechanical deformation of the fuel. We have minimized this problem, to a great degree, in two ways. Frst, by enriching the fuel we have been able to use stronger fuel element construction materials, since neutron economy is less decisive in enriched systems than it is in natural systems; and we have been able to use refractory fuels which do not display the mechanical distortion which is characteristic of other fuels, notably uranium metal. Ssecondly, we have suspended the fuel in tension in our reactors leaving one end free to absorb any deformation which may occur. By maintaining the fuel elements in tension, column buckling caused by weakening under compressive loading is eliminated.

It is a further object of the invention to provide means for locating and hanging fuel elements in tensions within a reactor core.

A still further object is to provide such locating and hanging means with a minimum amount of neutron-absorbing structural material.

We additionally provide novel means for supporting a fuel mass in tension within a reactor core, which comprises a substantial mass of a solid neutron moderator having a multiplicity of channels passing vertically therethrough, each of the channels having at least two longitudinal guiding recesses equally spaced around its periphery, a multiplicity of fuel hangers, each of which is provided with at least two protruding members adapted to engage and slide within the longitudinal recesses, and means provided at at least one location along each of the channels to prevent the fuel hangers from sliding within the longitudinal recess.

The supporting means which we have provided is unique in that heavy fuel masses can be supported with a minimum of foreign structural equipment. The reactor moderant itself, by means of the recesses which are provided in the walls of channels cut therethrough, guides all fuel elements to their proper place within the reactor. In addition, the moderator mass in the preferred embodiment also bears the full load of the fuel, thereby eliminating the necessity of the presence of a neutron-absorbing, load-bearing structure within the active portion.

Figure 3:
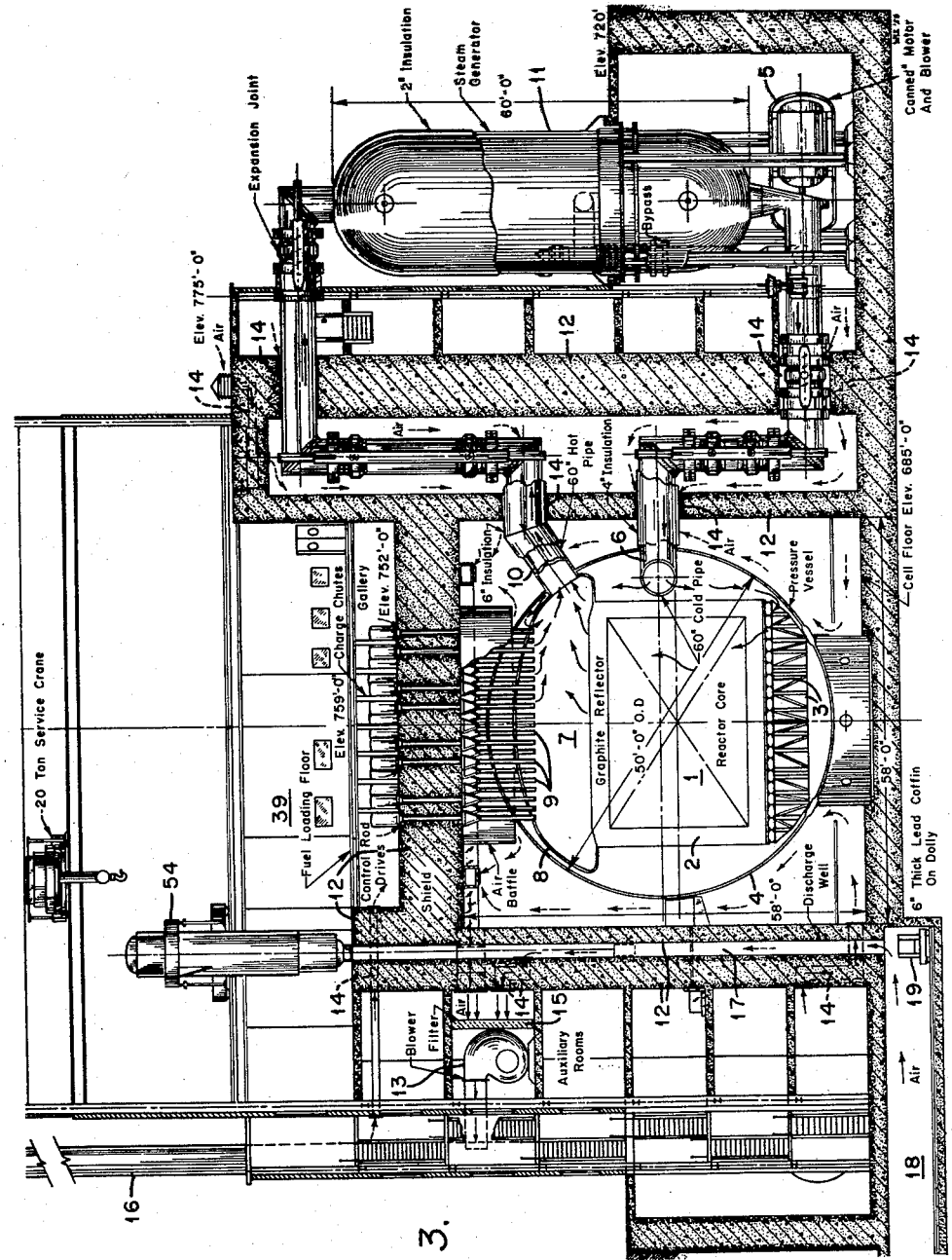
FIG. 3 is a vertical elevation, partially in section, of one reactor embodiment and its associated equipment.

Describing our invention in still greater detail by using a specific embodiment as illustrative thereof, reference is made first to FIG. 3, which is a section view through one reactor embodiment and its associated equipment.

The reactor core 1, which is, essentially, a right-circular cylindrical array of stacked graphite blocks, is surrounded by a completely encompassing graphite reflector 2 and supported by a platform 3. A spherical pressure shell 4 completely surrounds the core and reflector and is an integral part of the coolant passageway. Cool helium, which is circulated by a blower 5, enters the pressure shell through conduit 6 (cold pipe), which penetrates the pressure shell at its equatorial plane. A portion of the inlet gas flows downward from the inlet to the bottom of the reactor core and then flows upwardly through vertical coolant channels which are provided in the core and emerges into the space 7 defined by an outlet header 8 and the top of the graphite reflector 2. The outlet header 8 is affixed to the top of the reactor core in gas-tight relationship therewith. The other portion of the inlet gas is circulated to the top region of the pressure shell and enters the outlet header around the charging tubes (described later) and reunites with the first portion of the cooling gas. The entire heated helium stream is then withdrawn from the reactor through an outlet conduit 10 (hot pipe) and is circulated to a steam generator 11. Actually, the reactor is provided with four steam generators and coolant loops which are identical to the one shown in FIG. 3.

The entire reactor including the pressure shell is completely surrounded by a concrete shield 12 through which colant air is circulated utilizing a blower 13 and air channels 14. After circulating through the shield system the air is passed through a filter 15 and exhausted to the atmosphere through a vent stack 16. A fuel discharge well 17, which also serves as an air inlet, communicates with a discharge tunnel 18. The tunnel is provided with a dolly 19 for the transportation of spent fuel elements to a storage pond.

Figure 6:
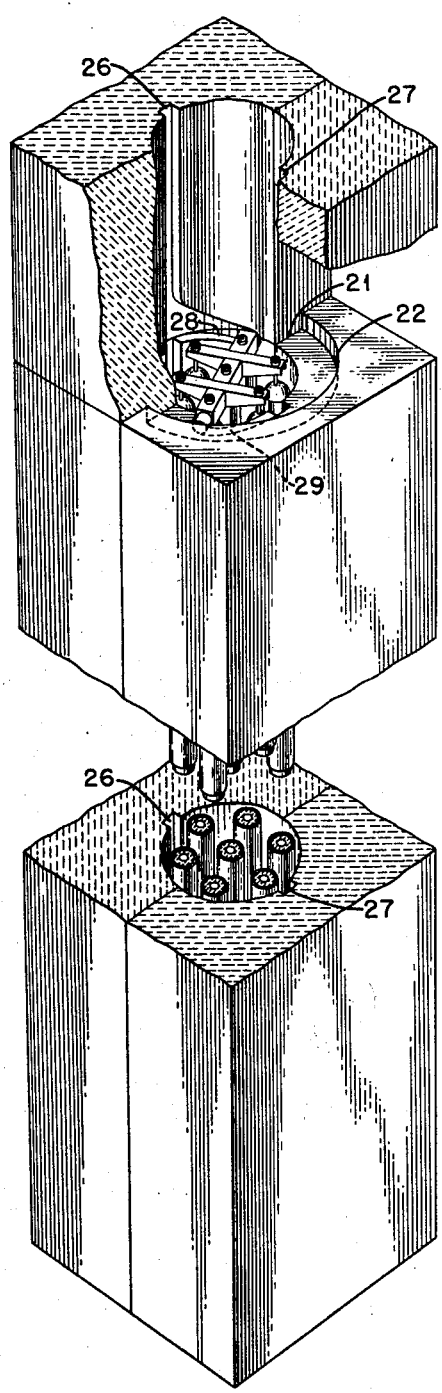
FIG. 6 is a perspective view, partially in section, of a fueled moderator block from the reactor core.
Figure 4:
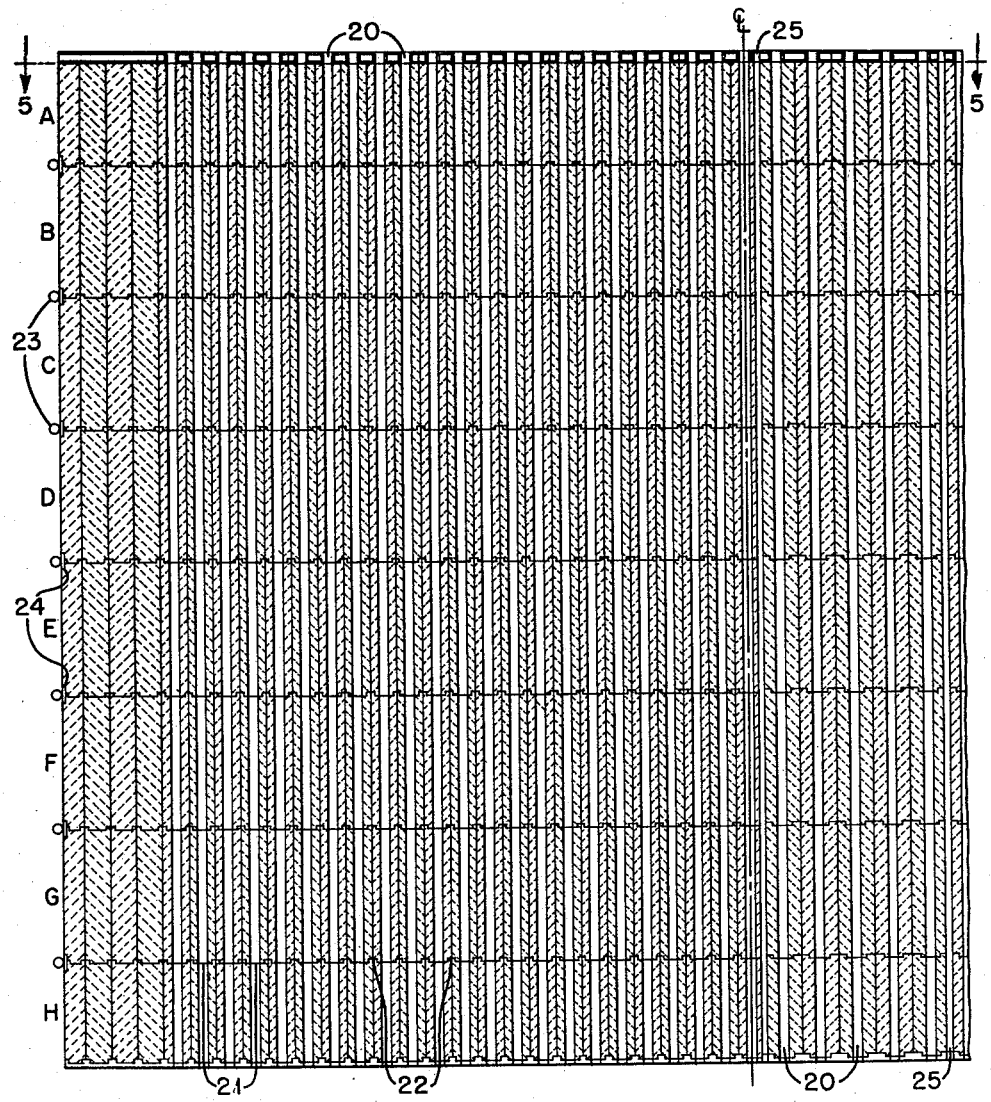
FIG. 4 is a partial vertical section of the reactor core.
Figure 5:
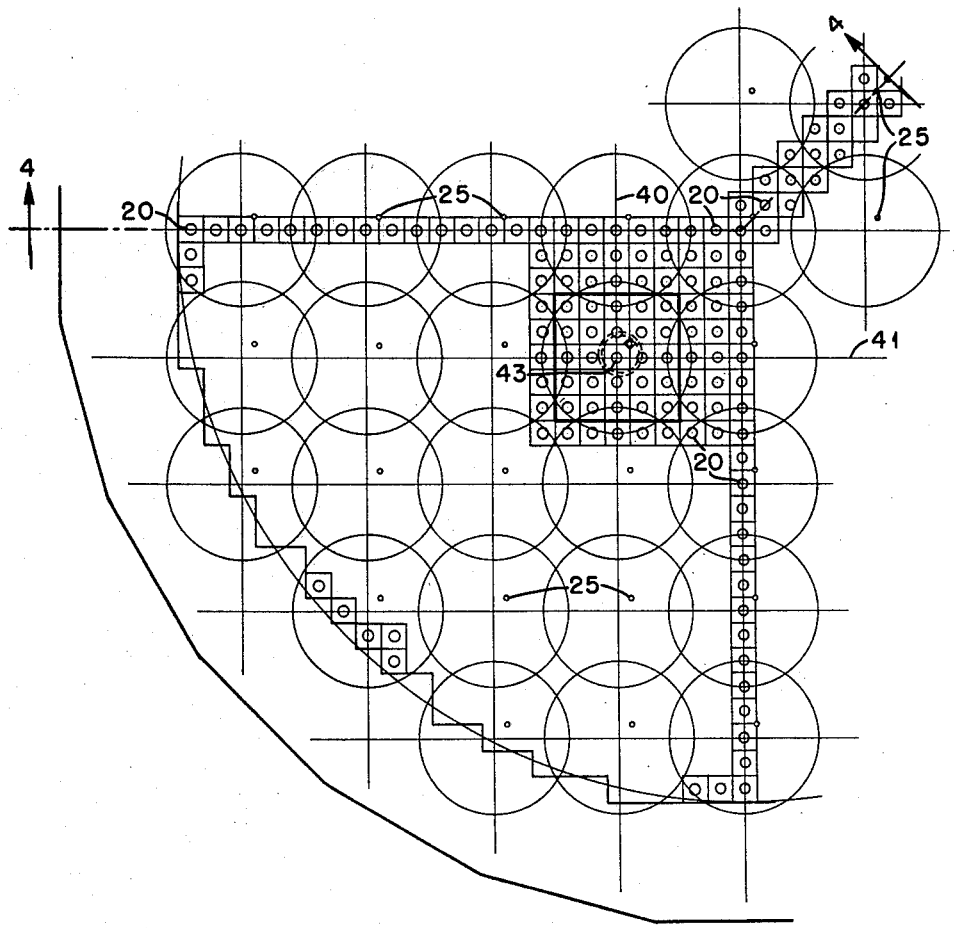
FIG. 5 is a partial plan view of the top reflector of the reactor.

Referring next to FIGS. 4 and 5 which are vertical and horizontal sectional views, respectively, of the reactor core and its encompassing reflector, eight vertically-stacked, horizontal, cylindrical layers (A through H) of graphite blocks are provided. Layers A and H, which are the top and bottom reflectors, respectively, consist of rectangular graphite blocks. Layers B through G are fuel layers and, therefore, comprise the active portion of the reactor, consisting of a multiplicity of stacked graphite blocks. The outer portion of each layer forms the side reflector of the reactor which is a twenty-four sided figure. Twenty-four sides are provided by chamfering the peripheral columns of the side reflector. Each of the graphite blocks, with the exception of those in the side reflector, is provided with an axial channel 20, a centered pilot 21 at its lower end, and a centered counter-bored hole 22 at its upper end, as shown in greater detail in FIG. 6. Each moderator block may be fabricated in two portions as shown in FIG. 6 or may alternatively be fabricated from one graphite block, the machining operations being different in the two cases. The pilot of each block is adapted to fit into the counter-bored hole of the block immediately beneath it, so that the blocks are aligned when stacked vertically. In the reactor core 8 blocks (6 fueled plus 2 reflector) are stacked vertically to provide a continuous vertical channel. 1597 channels are formed in the manner shown in FIGS. 4 and 5. Seven retaining hoops 23 bear on a multiplicity of plates 24, which bear in turn on the graphite reflector blocks, preventing, thereby, lateral displacement of the eight layers of blocks relative to each other.

Surrounding the graphite reflector is a boron thermal-neutron-curtain (not shown) to absorb a high percentage of the thermal neutrons escaping from the reactor core and thereby minimize thermal stresses in the pressure vessel and neutron-capture gamma radiation incident on the biological shield. The curtain is formed of a multiplicity of Pyrex glass sheets encased in sheet steel to prevent dispersal of glass fragments in the event that glass is fractured either mechanically or as a result of prolonged neutron irradiation.

In addition, 61 vertical control rod channels 25, having a square cross section, are provided for the acceptance of 61 stainless-steel-encased silver control rods. The square channels are distributed across the reactor in a square lattice having a spacing of 40 inches, as shown in FIG. 5, and are formed by chamfering the adjacent corners of four contiguous columns of blocks.

Referring conjunctively to FIG. 6, which is a view of a fuel block having a fuel element in place therein, and to FIGS. 7, 8 and 9, which are detail views of a fuel element, each bored graphite block in the reactor is provided with two substantially opposed, longitudinal guiding recesses 26 and 27. The eight layers of blocks are stacked so that the guiding recesses of the blocks in any layer of any vertical column are aligned with the guiding recesses of the blocks in the other layers of that column thereby providing each channel with two vertically disposed continuous guiding recesses. Each fueled block, such as the block shown in FIG. 6, is additionally provided with a pair of circumferential recesses 28 and 29 which communicate with the longitudinal guiding recesses 26 and 27 in the manner shown. These recesses preferably have the configuration of a downwardly-sloping helical slot.

FIG. 7 displays a fuel hanger adapted to carry seven fuel capsules. Each fuel hanger in the reactor has two protruding members or runners 30 and 31, which are adapted to engage and slide within the longitudinal guiding recesses 26, 27 and the circumferential recesses 28, 29 described above. A complete fuel element is disposed within each graphite block in the active portion of the reactor (layers B—G, excluding the side reflector), and consists of a hanger (FIG. 7), a bottom spacer (FIG. 8) and seven fuel capsules (FIG. 9). Each hanger is provided with one central and six hexagonally disposed holes 32 and each bottom spacer also has seven holes 33 arranged in a similar pattern so that the one hanger and one bottom spacer will accept seven fuel capsules and maintain them in spaced parallel relationship. The stainless steel fuel capsules, each of which consist of a bottom cap 34, a top cap 35, and a tubular body portion 36 welded between the end caps, carry hollow cylindrical $UO_2$ fuel slugs 37 and $MgO$ end-spacers 38. Two nuts, 39 and 40, are provided to mount each fuel capsule between a hanger and bottom spacer. The threaded rod portion 41 of the bottom end cap is hollow and serves as means to evacuate and purge the fuel capsule during fabrication. Uranium fuel slugs 37 are fabricated from compacted and sintered $UO_2$ particles. The two end spacers 38 (only one is shown in FIG. 9) serve merely to fill the hemispherical end caps and maintain the fuel within the tubular portion of the fuel capsule. They may suitably be fabricated from refractory grade magnesia by compacting and sintering to a density of 2.2 g./cc. The central vertical channel is present within each fuel capsule by virtue of the hollow cylindrical design of the fuel slugs, and provides space for the collection and retention of gaseous fission products. Upon extended reactor operation $UO_2$ fragments may cause difficulty by spalling from the interior surfaces of the hollow fuel slugs and accumulating at the bottom of the channel in each capsule thus causing localized overheating or "hot spots." This condition may be prevented by providing the fuel capsule channels with a porous rod or tube comprised of a refractory ceramic material such as magnesium oxide.

Reverting to FIG. 3, reference numeral 39 shows the location of the operating floor, from which the reaction is loaded. A multiplicity of charging tubes 9 penetrate the shield and pressure shell of the reactor and thereby communicate with the reactor core. Since the reactor has 1597 fuel channels, 1597 charging chutes would be necessary if one charging chute services only one channel, and 1597 undesirable penetrations of the pressure shell would be necessary. However, the core of the reactor is, as is shown in FIG. 5, made up of square groups of twenty-five channels each (with peripheral groups, of course, being incomplete squares with less channels). The intersection of any two of the lines such as 40 and 41 gives the location of the central channel in a square twenty-five channel group. One such square twenty-five channel group is shown in detail in FIG. 10, with reference numeral 43 designating the central channel of that group.

Figure 10:
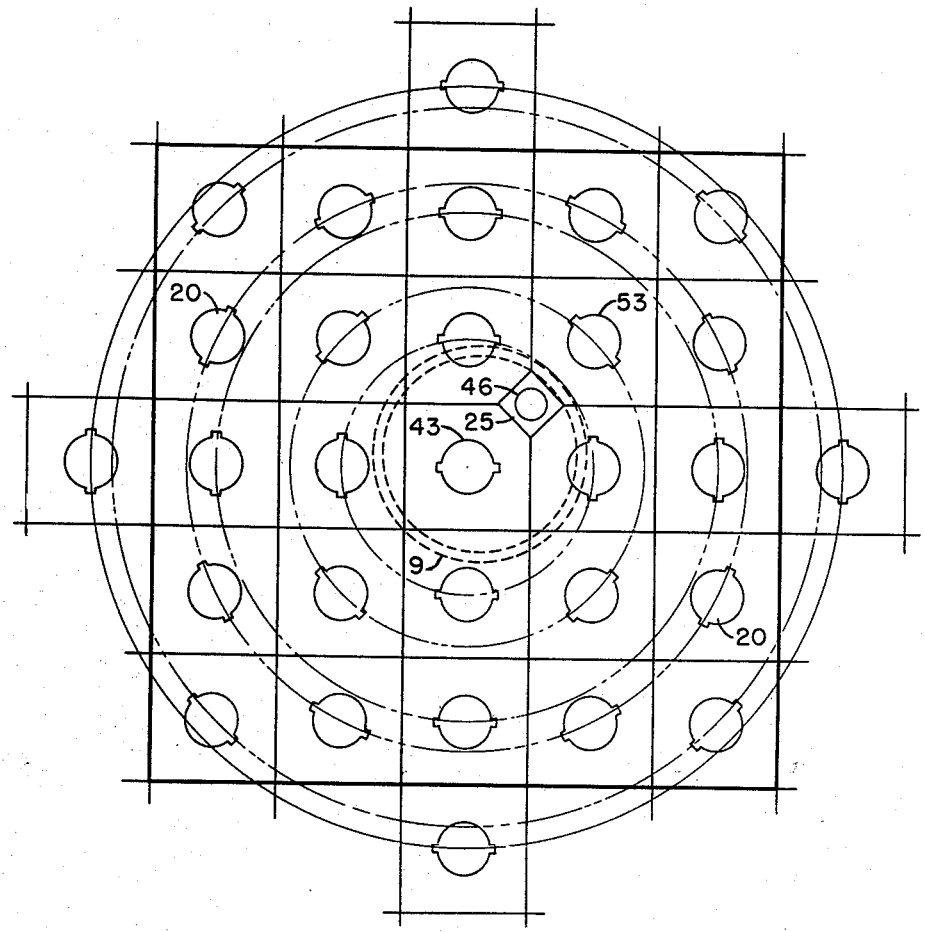
FIG. 10 is a plan view of a twenty-five channel array of the reactor core.

Turning to FIG. 11, which is a detail view of a charging tube, each charging tube 9 extends from the operating floor 39 through outlet header 8 to a position within the space 7 of FIG. 3. The tube is provided at its upper extremity with a removable shield plug 4, and a motor driven valve 45. Within the charging tube is located a control rod 46, which is suspended by a cable 47, operated by a motor driven winch 48. One charging tube is permanently provided for each of the above-described twenty-five channel sections and is located directly above the central channel of each section. (FIG. 10 shows the location of the charging tube 9 with respect to the central channel 43 and control rod 46). Each charging tube is also adapted to accept a loading device, herein referred to as a charging chute, which is designated by reference numeral 49 in FIG. 11. The charging chute extends from the operating floor (the charging chute is shown partially broken away in FIG. 11 to allow illustration of the valve and shield plug) to a charging pan 50, which rests on the top of the reflector 2, and is centered over the central channel of a twenty-five channel section. The charging chute is positioned within a charging tube only temporarily while channels in the section served by that particular tube are loaded or unloaded. At the bottom extremity of the charging chute, a chute extension 51 is provided so that the 24 channels surrounding the central channel may be serviced. The chute extension is supported in parallel relationship with the charging chute by a movable linkage 52 which is pivotally attached to the extension. The linkage arms are pivotally secured at their other ends to two relatively movable vertical slides located (not shown) within the main charging chute in such a manner that relative vertical motion of the slides causes a radial, i.e., horizontal displacement of the charging chute extension. Each movable slide is driven by a vertically disposed drive screw (not shown) which extends from the bottom of the main charging chute to the operating floor level where it is driven by a conventional drive mechanism (not shown). Movement of the slides to reduce their relative vertical displacement increases the radial displacement of the chute extension and movement of the slides to increase their relative vertical displacement reduces the displacement. With minimum relative vertical displacement of the slides the extension is completely withdrawn into the main charging chute.

Referring again to FIG. 10, the central channel 43 is assumed to be directly beneath a charging chute. The other twenty-four channels of this particular twenty-five channel square array are located on one of five radii around the central channel and at a specific angle away from the axis of the square section. Channel 53, for example, is located on the second radius (11.32 inches from the central channel) at an angle of 45° from either axis. It can be seen, therefore, that each channel can be indexed by one of five radial displacements plus an angle. The charging chute 49 is rotatably mounted within the charging tube 9 (FIG. 11) and is rotated from the operating floor to index the charging chute extension to the proper angle for the channel to be serviced (45° in the case of channel 53) and the extension is moved to the required radial displacement (11.32 inches in the case of channel 53) by operation of the drive screws and slides as described above.

Returning to FIG. 3, a shielded fuel element coffin 54 is shown in position over the fuel discharge wells 17. The coffin is movably mounted on a system of tracks so that it can be easily positioned over any of the charging tubes. Within the coffin, a motor driven winch is provided to withdraw and insert fuel elements into the active portion and provision is made, therein, to temporarily store fuel elements. The coffin is shielded so that spent radioactive fuel elements may be discharged from the reactor; but, if two or more such devices are provided and one of these is used only to load unused fuel elements into the reactor, shielding need not be provided for it. Attached to the free end of the winch cable is a fuel element grab, which is shown in detail in FIGS. 12 and 13. The fuel element grab is capable of grasping the hanger of a fuel element, retaining it until the fuel element is in the proper vertical position within a reactor channel, and rotating the fuel element to index the protruding members of the fuel element hanger into the circumferential recesses provided in the walls of the channel.

Referring now to FIGS. 12 and 13, the fuel element grab assembly comprises a non-rotating casing 55 carrying runners 56 and 57 adapted to slide within slots 26, 27 (FIG. 6) of a column of moderator blocks, and a rotatable casing 58 attached to the non-rotating casing 55 by free-turning thread means 59. The thread means 59 should permit rotation of casing 58 relative to casing 59 through approximately 60° of arc, or at least through the full arc of the circumferential recesses 28, 29 (FIG. 6) in the moderator blocks. A pair of jaws 60 are pivotally mounted in casing 58 and are adapted to be opened by a first rotary solenoid 61 acting through cams 62. The solenoid 61 is spring-biased to maintain the jaws 60 normally in closed position.

The non-rotating casing 55 carries a second rotary solenoid 63 and a third rotary solenoid 64 having fixed central shafts connected by coupling 65. The housings of solenoids 63 and 64 are adapted to rotate about the fixed central shafts, when the solenoids are actuated, and their rotary motions are coupled through a free-rotating spacer 66 having sockets to receive pins 67 carried by the housing of solenoid 63 and pin 68 carried by the housing of solenoid 64. The housing of solenoid 64 carries an additional pin 69 which is received in a socket in the adjacent end member of casing 58 and serves to impart rotary motion to casing 58 and thereby to jaws 60. The two solenoids 63, 64 are actuatable for rotary motion in opposite directions, one serving to rotate the protruding members 30, 31 (FIG. 7) of a fuel hanger into a pair of circumferential recesses 28, 29 (FIG. 6) and the other serving to rotate the protruding members of a hanger out of such recesses.

The casing 58 also carries a limit switch finder assembly 70, adapted to press against a channel wall while the grab assembly is being lowered into a channel and to signal the operator or to effect automatic actuation of the solenoids when the proper circumferential recess is located.

A refueling sequence proceeds as follows: the reactor is brought down to zero power, cooled, and evacuated of helium. From the operating floor the shield plug is removed from the charging tube and a charging chute is positioned therein. The fuel element coffin is positioned over the charging chute, the control rod for this particular twenty-five channel section is withdrawn, and a grab assembly attached to a cable is lowered into the charging chute until it is disposed within the chute extension. The chute extension is positioned over a selected fuel channel by rotating the charging chute and displacing the extension radially. The fuel element grab is then lowered into the selected channel until its limit switch finder actuates the grab assembly and removes a fuel element from its circumferential recess. The fuel element is then pulled upwardly and positioned within the chute extension, the chute extension is returned to the central position, and the fuel element is withdrawn upwardly through the charging chute into the coffin. Within the coffin, the fuel element is detached from the grab assembly and stored while the process is repeated until the selected channel is emptied and the discharge storage rack of the coffin is full. The channel is then refueled by reversing the above-outlined procedure, utilizing fuel elements from the charge storage rack of the fuel element coffin. The coffin is then positioned over the fuel discharge well and the spent fuel elements in the discharge storage rack are lowered onto a dolly for removal to a storage pond.

In this manner, the twenty-four eccentrically disposed channels of each twenty-five channel section are loaded and unloaded. The central channel, which is disposed immediately beneath a charging tube is loaded or unloaded with the charging chute extension retained in the central position.

Table I below gives the design specifications of this particular reactor embodiment.

TABLE I

*Over-All*

| | |
|---|---|
| Reactor thermal output, B.t.u./hr | $2.39 \times 10^9$ |
| Reactor thermal output, mf | 700 |
| Gross electrical output, mw | 252 |
| Net electrical output, mw | 225 |
| Net over-all efficiency, percent | 32.1 |

*Fuel*

| | |
|---|---|
| Fuel composition | $UO_2$ |
| Fuel enrichment, percent | 2 |
| Total weight of uranium, tons | 150.8 |
| Burn-up, mwd./t | 7350 |
| $UO_2$ average density (95% theoretical), g./cm.$^3$ | 10.4 |
| $UO_2$ minimum density (94% theoretical), g./cm.$^3$ | 10.28 |
| Fuel temperature coefficient per °C | $-4.7 \times 10^{-5}$ |

*Fuel Element*

| | |
|---|---|
| $UO_2$ slug O.D., in | $0.75 \pm 0.005$ |
| $UO_2$ slug I.D., in | $0.32 \pm 0.010$ |
| $UO_2$ slug length, in | $0.50 \pm 0.003$ |
| $UO_2$ slug internal temperature (maximum), °F | 2200 |
| $UO_2$ slug thermal stress (for ideal rigid body), p.s.i. | 150,000 |
| Weight of $UO_2$ slugs per capsule, kg | 2.31 |
| Number of $UO_2$ slugs per capsule | 75 |
| Capsule material | 304 SS |
| Capsule O.D., in | 0.80 |
| Capsule wall thickness, in | 0.020 |
| Capsule length, in | 38.5 |
| Capsule internal surface: | |
| Ft.$^2$ per linear ft | 0.199 |
| Ft.$^2$ per capsule | 0.6375 |
| Ft.$^2$ per reactor | 42,760 |
| Capsule external surface: | |
| Ft.$^2$ per linear ft | 0.2094 |
| Ft.$^2$ per capsule | 0.6717 |
| Ft.$^2$ per reactor | 45,050 |
| Capsule internal surface heat flux: | |
| Maximum, B.t.u./hr.-ft.$^2$ | 96,000 |
| Average, B.t.u./hr.-ft.$^2$ | 56,000 |
| Capsule average surface temperature, °F. (approx.) | 1000 |
| Capsule maximum design surface temperature in hot zone, °F | 1200 |
| Capsule maximum allowable surface temperature (including hot spots), °F | 1500 |
| Absorption cross section at 2200 m./sec. of capsules and supports, cm.$^2$/ft.-U | 19.0 |
| Weight of 304 SS per capsule, kg | 0.248 |
| Number of capsules per element | 7 |
| Number of capsules per reactor | 67,074 |
| Number of elements per channel | 6 |
| Number of elements per reactor | 9582 |
| Nominal length of element, in | 40 |

*Table I—Continued*

Reactor Core

| | |
|---|---|
| Material | Graphite, grade TSF |
| Nominal core height, ft | 20 |
| Nominal core diameter, ft | 30 |
| Height of graphite, ft | 25 |
| Distance across corners of graphite, ft | 35 |
| Machined weight of graphite, tons | 1122 |
| Core graphite density, g./cm.³ | 1.65 |
| Core graphite absorption cross section, millibarns | 4.0 |
| Reflector graphite density, g./cm.³ | 1.65 |
| Reflector graphite absorption cross section, millibarns | 4.0 |
| Graphite blocks: | |
|     Length, in | 40 |
|     Width, in | 8 |
|     Depth, in | 8 |
| Total graphite volume, ft.³ | 21,784 |
| Number of fuel channels | 1597 |
| Number of fuel charge tubes | 69 |
| Spacing of channels, in | 8 |
| Type of spacing | Square |
| Diameter of fuel channels, in | 345 at 3.45 / 400 at 3.25 / 852 at 3.05 |
| Moderator temperature coefficient, at $T_m = 400°$ C., per °C.: | |
|     Maximum | $-14 \times 10^{-5}$ |
|     Minimum | $-4 \times 10^{-5}$ |
| Total excess reactivity, percent | 10 |
| Thermal flux at 2200 m./sec./cm.²-sec. | $5 \times 10^{12}$ |

Control Rod

| | |
|---|---|
| Number of control rods | 61 |
| Control rod: | |
|     O.D., in | 2 |
|     I.D., in | 1.25 |
|     Material | Silver |
| Control rod sheath | SS |
| Control rod length, ft | 18 |
| Suspension | SS cable |
| Drive: | |
|     Slow in and out | A.C. motor, winch |
|     Fast in | Pneumatic |
| In speed: | |
|     Fast, in./min | 84.8 |
|     Slow, in./min | 8.48 |
| Out speed, in./min | 8.48 |
| Reactivity invested in rods, percent $\delta k/k$ | 14.5 |
| Reactivity per rod, percent | 0.24 (average) |
| Number of rods on temperature servo | 4 |
| Nominal in speed, average $\Delta k/k$/sec | $10^{-4}$ |
| Fast in speed, average $\Delta k/k$/sec | $10^{-3}$ |
| Normal out speed, average $\Delta k/k$/sec | $10^{-4}$ |

Shielding

| | |
|---|---|
| Thermal neutron shield material | Borosilicate glass |
| Thermal neutron shield thickness, in | 0.5 |
| Biological shield material | Concrete |
| Biological shield thickness, ft | 9 |
| Biological shield density, lb./ft.³ | 145 |
| Biological shield shape | Octagon |
| Biological shield distance across flats, ft | 76 |
| Biological shield height, ft | 67 |
| Total weight on foundation, tons | 23,400 |
| Cooling, forced | Air |

Pressure Vessel

| | |
|---|---|
| Shape | Sphere |
| Diameter, O.D., ft | 50 |
| Material | SA212–B |
| Thickness, in | 3.250 |
| Working pressure, p.s.i.g | 300 |
| Design stress, p.s.i. | 15,000 |
| Maximum temperature, °F | 650 |
| Volume, ft.³ | 63,333 |
| Weight of graphite support structure, lb | 144,000 |
| Weight of vessel support structure, lb | 38,000 |
| Gross vessel weight (including vessel and graphite supports, thermal barriers, nozzles, and insulation), lb | 1,541,000 |

Coolant

| | |
|---|---|
| Gas | Helium |
| Working pressure, p.s.i.a | 300 |
| Total flow (normal) lb./sec | 972 |
| Reactor inlet temperature, °F | 450 |
| Reactor outlet temperature, °F | 1000 |
| Number of inlet and outlet pipes | 4 each |
| Diameter of pipe, I.D., ft | 5 |
| Mean coolant velocity: | |
|     Cool pipe, ft./sec | 100 |
|     Hot pipe, ft./sec | 161 |
| Total volume occupied by helium, ft.³ | 107,000 |
| Circuit pressure drop, p.s.i. | 6.61 |
| Specific heat capacity of helium, B.t.u./lb. °F | \* 1.24 |

\* Used in calculations.

Coolant Blowers

| | |
|---|---|
| Type | Axial |
| Number per reactor | 4 |
| Number per steam generator | 1 |
| Adiabatic efficiency, percent | 80 |
| Compression power, B.H.P | 5700 |
| Speed (constant), R.P.M | 3580 |
| Power for 4 blowers, mw | 18.3 |
| Blower drive motor, B.H.P | 6000 |

Steam Generator

GENERAL

| | |
|---|---|
| Type of generator | Once-through |
| Number per reactor | 4 |
| Shell height between heads, ft | 40 |
| Shell height including heads, ft | 60 |
| Shell I.D., ft | 20 |
| Shell thickness, in | 2.75 |
| Gas inlet I.D., ft | 5.0 |
| Gas outlet I.D., ft | 5.0 |
| Gas bypass I.D., ft | 2.5 |
| Steam outlet drums: | |
|     Length, ft | 21.5 |
|     O.D., in | 28 |
|     Wall thickness, in | 1.875 |
| Feed-water inlet drums: | |
|     Length, ft | 19.5 |
|     O.D., in | 28 |
|     Wall thickness, in | 1 |
| Gas inlet temperature, °F | 1000 |
| Gas outlet temperature, °F | 450 |
| Feed-water inlet temperature, °F | 325 |
| Feed-water pressure, p.s.i.a | 1020 |
| Feed-water enthalpy, B.t.u./lb | 297.1 |
| Steam outlet: | |
|     Temperature, °F | 950 |
|     Pressure, p.s.i.a | 950 |
|     Superheat, °F | 411.6 |
| Total steam flow (normal) lb./hr | 2,020,000 |

Although our invention is illustrated herein by a description of one particular embodiment, it is to be understood that many deviations from and modifications of that embodiment may be made within the scope of our invention. For example, the enrichment, lattice spacing, materials of construction, dimensions, and operating conditions given in Table I are optimum values for this particular reactor embodiment only, and are, therefore, subject to change. Accordingly, our invention should be limited only as indicated in the appended claims.

What is claimed as novel is:

1. A neutronic reactor core and system for locating and suspending fuel elements therein comprising a substantial mass of a solid neutron moderator having a multiplicity of channels passing vertically therethrough, each of said channels being provided with at least two longitudinal recesses equally spaced about its periphery, said recesses extending along the entire length of said channels, each of said longitudinal recesses being provided at at least one location along its length with an intersecting, partially circumferential groove, said groove being inclined downwardly away from said recess, each of said recesses having said grooves at corresponding horizontal positions, said grooves being displaced from said recesses in the same angular direction with respect to the vertical axis of said channels, and a multiplicity of rigid fuel hangers, each of said hangers being provided with at least two radially protruding members for slidably engaging said longitudinal recesses and said grooves.

2. The device of claim 1, wherein each of said partially circumferential grooves decreases in width at increasing distances away from said longitudinal recesses so as to clamp said radially protruding members in place.

References Cited in the file of this patent

UNITED STATES PATENTS

| | | |
|---|---|---|
| 2,773,823 | Goett | Dec. 11, 1956 |
| 2,810,689 | Wigner et al. | Oct. 22, 1957 |
| 2,831,807 | McGarry | Apr. 22, 1958 |
| 2,856,515 | Leichtung | Oct. 14, 1958 |
| 2,863,815 | Moore et al. | Dec. 9, 1958 |
| 2,936,273 | Untermyer | May 10, 1960 |
| 2,985,575 | Dennis et al. | May 23, 1961 |

FOREIGN PATENTS

| | | |
|---|---|---|
| 784,890 | Great Britain | Oct. 16, 1957 |
| 794,981 | Great Britain | May 14, 1958 |
| 216,588 | Australia | Aug. 8, 1958 |
| 1,223,823 | France | Feb. 1, 1960 |

OTHER REFERENCES

Parkins: Pages 296–300, vol. 3, International Conference on the Peaceful Uses of Atomic Energy.